United States Patent
Görden et al.

[11] Patent Number: 5,494,629
[45] Date of Patent: Feb. 27, 1996

[54] PROCESS FOR THE PRODUCTION OF POROUS MOLDINGS

[75] Inventors: Sabine Görden, Krefeld; Hermann van Laak, Hünxe; Holger Schmitz, Oberhausen, all of Germany

[73] Assignee: Hoechst Aktiengesellschaft, Germany

[21] Appl. No.: 350,253

[22] Filed: Dec. 5, 1994

[30] Foreign Application Priority Data

Dec. 6, 1993 [DE] Germany .......................... 43 41 497.4

[51] Int. Cl.⁶ .................................................. B29C 45/00
[52] U.S. Cl. .............................................. 264/126; 264/41
[58] Field of Search ....................................... 264/126, 41

[56] References Cited

U.S. PATENT DOCUMENTS

| | | | |
|---|---|---|---|
| 3,847,888 | 11/1974 | Baumgaertner | 264/126 |
| 4,281,070 | 7/1981 | Scheetz et al. | 525/1 |
| 4,518,552 | 5/1985 | Matsuo et al. | 264/126 |
| 4,876,049 | 10/1989 | Aoyama et al. | 264/49 |
| 4,925,880 | 5/1990 | Stein | 521/98 |
| 5,037,928 | 8/1991 | Li et al. | 264/126 |
| 5,200,129 | 4/1993 | Kobayashi et al. | 264/119 |

*Primary Examiner*—Mary Lynn Theisen
*Attorney, Agent, or Firm*—Bierman and Muserlian

[57] ABSTRACT

Porous moldings of ultrahigh-molecular-weight polyethylene obtained by injection molding polyethylenes having an intrinsic viscosity of 500 to 5000 ml/g, a mean particle size of 100 to 1500 μm, and a bulk density of at least 0.35 g/cm³. The polymer is preferably molded in an injection-molding machine at 160° to 260° C. and an injection pressure of 80 to 150 MPa. The ratio between the flow distance of the material in the injection mold and the wall thickness of the molding is a maximum of 7.5.

7 Claims, 1 Drawing Sheet

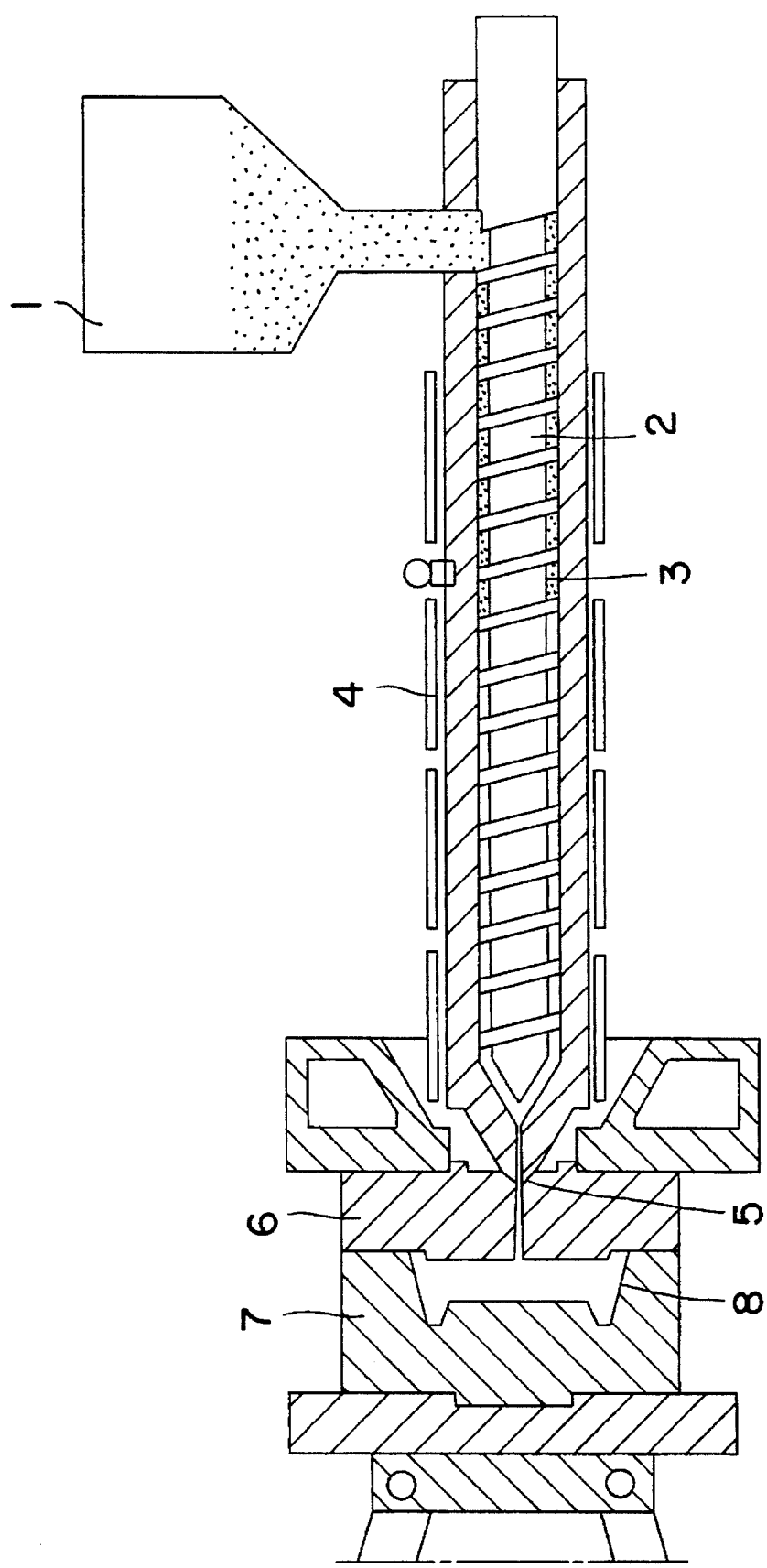

PROCESS FOR THE PRODUCTION OF POROUS MOLDINGS

This application claims the benefit of the priority of German P 43 41 497.4, filed Dec. 6, 1993.

The Invention relates to a process for the production of porous moldings from pulverulent, ultrahigh-molecular-weight polyethylene (PE-UHMW) by injection molding.

BACKGROUND OF THE INVENTION

Porous moldings made from thermoplastics are known. They are used extensively in various areas of technology, for example for gas and liquid filtration at elevated and normal temperatures (filter cartridges). They are also used for the dispersal of gases in liquids, as insulating materials for refrigeration equipment, as thermal protection, vibration elements, cushioning materials, boat bumpers, electrolytic membranes in batteries, air cushions, and in the textile and packing industries, among others. Numerous processes have been developed for the production of porous moldings from thermoplastics. Their differences take into account the properties of the starting materials and the requirements made of the products.

In a process described in DE-C-1 176 850, solid, porous articles are produced by sintering mixtures of two polyolefins of different molecular weights. The polyolefins differ by at least 5° C. in their softening ranges and by at least 5000 in their viscosimetric molecular weights. The mixing ratio between low-molecular-weight and high-molecular-weight polyolefins is from 1:1.5 to 10 parts by weight. The mixture is introduced into molds and heated to the temperature necessary for sintering.

A modification of the above procedure is described in DE-C-1 232 743. This publication teaches the production of solid, porous articles by sintering mixtures of at least two polyolefins which differ in their viscosimetric molecular weight ranges. The mixtures contain from 40% to 80% by weight of the low-molecular-weight polyolefins, and the molecular weight range of the high-molecular-weight polyolefins is at least three times that of the low-molecular-weight polyolefins.

DE-C-1 255 298 discloses a process for the production of sintered, porous articles from pulverulent polymers of aliphatic olefins. The polymer powder is allowed to drop loosely onto a heated plate, and the individual particles are fritted to one another by constant heating. The process is continued by placing finely divided starting material in layers on the fritted base layer, fritting them to one another in this way and thereby building up a porous article.

The above-described processes start from thermoplastics which melt or at least soften at elevated temperature. If it is certain that the individual particles soften only at the surface, they coalesce to form a stable solid through which pass channels which ensure it is permeable to fluid media. A variant of this process uses mixtures of at least two polyolefins, of which at least one softens on heating and acts as a binder for the other.

In contrast to the low-molecular-weight thermoplastics described above, high-molecular-weight polymers do not melt without degradation on heating, but instead are converted into a viscoelastic state. The polymer particles therefore cannot bind strongly to one another at the points of contact by surface melting and subsequent solidification of the melt. The production of porous moldings from such thermoplastics therefore requires special processes which differ from those used for the processing of plastics of relatively low-molecular-weight.

The high-molecular-weight plastics which do not melt without decomposition on heating, but instead take on viscoelastic properties, include ultrahigh-molecular-weight polyethylene (PE-UHMW). This is linear polyethylene of extremely high melt viscosity which results from the low pressure process. Its intrinsic viscosity is at least about 1000 ml/g, corresponding to weight average molecular weight of at least about $1 \times 10^{-6}$. The conversion of the intrinsic viscosity into molecular weights is according to the Margolis equation, and the method used for the determination is described, for example, in CZ-Chemische Technik 4, 1974, page 129 ff.

PE-UHMW is distinguished by a number of physical properties which give it a variety of potential applications. It has high resistance to wear, a low coefficient of friction against other materials, excellent toughness, and high heat distortion resistance. In addition, it is notably resistant to numerous chemicals. These particular mechanical, thermal and chemical properties enable ultrahigh-molecular weight polyethylene to be used as a high-grade specialty material in a wide variety of areas, including porous moldings.

Various processes are known for the conversion of high-molecular-weight polyethylene into porous moldings. Thus, according to DE-C-1 241 599, pulverulent polymers having molecular weights of from 250,000 to greater than 500,000 and having broad melting ranges are used for this purpose. The starting material is heated in molds, giving solid, porous, uniformly sintered polyethylene materials.

Microporous membranes made from polyethylene having a weight average molecular weight of at least $5 \times 10^5$ and in particular from $1 \times 10^6$ to $10 \times 10^6$ are obtained, according to EP-B-160 551, by dissolving the polymer in a solvent and warming the solution. A gel film is formed from the solution, and the solvent is removed to a solvent content of 10% to 80% by weight. The film is subsequently warmed, stretched and free from residual solvent.

U.S. Pat. No. 4,925,880 relates to porous moldings made from ultrahigh-molecular-weight polyethylene having a molecular weight in the range from about $1 \times 10^6$ to about $6 \times 10^6$ and a polyethylene wax whose molecular weight is from about 1000 to 20,000. The pulverulent, heterogeneous mixture is heated in a compression mold under pressure until the wax melts. At the same time, the PE-UHMW particles soften and expand. Adjacent particles thus come into contact and bond to one another. The material is rapidly cooled, and the porous article is removed from the mold.

The preparation of porous materials from mixtures of PE-UHMW and another polyolefin, for example a polyethylene or a polypropylene, is also described in JP-A-86-283634 (cf. C.A. 106, Abstract 157477a). As an example, the preparation of a porous material comprising 40% PE-UHMW and polypropylene by sintering for 15 minutes at 200° C. is described. Particular mention is made of the resistance to chemicals, the mechanical strength, and the gas permeability.

A porous material consisting exclusively of ultrahigh-molecular-weight polyethylene is described in WO-A-92/08757. It is built up from individual polyethylene particles which have been bonded to one another to form pores. It is obtained by injection molding of plasticized PE-UHMW at a shear rate of at least $5 \times 10^4$ sec$^{-1}$ under such conditions that the quotient of the weight of the molding and its volume does not exceed 0.7 g/cm$^3$. In a preferred embodiment, a pore-forming additive, for example sodium chloride, is added to the plasticized PE-UHMW. The additive is removed from the molding with the aid of a solvent therefor which is inert to the polyethylene.

The known processes are not free from disadvantages. They require, for example, the use of mixtures of PE-UHMW and low-molecular-weight polyolefins or the addition of additives and thus impair certain properties of the ultrahigh-molecular-weight polymer. In other cases, the processes are not universally applicable, but are restricted to the production of moldings having certain dimensions.

It is, therefore, among the objects of the Invention to provide a process which yields porous moldings of ultrahigh-molecular-weight polyethylene. The process should, if possible, be universally applicable, should not require mixtures of ultrahigh and low-molecular-weight polyethylenes or the use of additives, and in addition, should be capable of being carried out using conventional means.

SUMMARY OF THE INVENTION

The above described objects are achieved by processing, in an injection-molding machine, polyethylene having intrinsic viscosities in the range from 500 to 5000 ml/g, a mean particle size of from 100 to 1500 μm, and a bulk density of at least 0.35 g/cm$^3$. The molding takes place at 160° to 260° C. and an injection pressure of 80 to 150 MPa, the ratio of flow distance of the material in the injection mold to the wall thickness of the molding being not greater than 7.5.

The production of compact moldings from PE-UHMW by injection molding is known. Surprisingly, however, it is also possible, in accordance with the Invention, to convert PE-UHMW which is characterized by certain properties into porous moldings of high homogeneity in injection-molding machines, provided that certain process criteria are observed. The novel process requires the use of neither blowing agents nor pore-forming additives. It should be emphasized that it is not restricted to the production of simple structures or those with small dimensions.

BRIEF DESCRIPTION OF THE DRAWING

The single Figure is a schematic view, partly in section, of an injection-molding machine useful in the practice of the Invention.

DETAILED DESCRIPTION OF THE INVENTION

The starting material is pulverulent PE-UHMW having an intrinsic viscosity (also known as the "Staudinger index") [η] of 500 to 5000 ml/g. The intrinsic viscosity is calculated in a known manner from the viscosity number η (determined experimentally in decalin as a solvent at 135° C.; cf. in this respect DIN 53728, Part 4) according to the Martin equation:

$$log\eta = log[\eta] + K \cdot c$$

where K is 0.139 and c is 0.03 g/dl for PE-UHMW grades having an intrinsic viscosity in the foregoing range. Preference is given to polyethylenes whose intrinsic viscosity is from 1300 to 3000 ml/g.

A further feature of the PE-UHMW processed by the novel process is its mean particle size, which is from 100 to 1500 μm. Mean particle size (particle diameter) is taken to mean the 50% value of the cumulative distribution of the particle diameter. It is determined by laser diffraction using a submicron HELOS instrument from SYMPATEC, Clausthal-Zellerfeld (cf., for example, PARTEC 1989 Conference Proceedings, 4th European Symposium on Particle Measurement Technology, Apr. 19–24, Nuremberg. Ultrahigh-molecular-weight polyethylene with a mean particle size of 200 to 1000 μm is preferable.

Finally, the starting material is also defined by a bulk density of at least 0.35 g/cm$^3$. Bulk density is the quotient of the weight and the volume of the polymer powder, determined in accordance with DIN 53468. The numerical value of the bulk density indicates that the polymer does not have a flake-like structure, but instead comprises spherical or approximately spherical particles. Ultrahigh-molecular-weight polyethylene having a bulk density of from 0.4 to 0.6 g/cm$^3$ is most desirable.

PE-UHMW grades having the requisite properties are commercially available products. They are obtained by the Ziegler process by polymerization of ethylene in the presence of compounds of transition metals from Groups IV to VI of the Periodic Table of the Elements (IUPAC Version) together with organometallic compounds of elements from groups I to III of the Periodic Table. An appropriate process is described, for example, in DE-C-23 61 508. However, it is also possible to employ ultrahigh-molecular-weight polyethylenes prepared from anhydrous, oxygen-free ethylene in the gas phase in the presence of supported catalysts containing chromium oxide and alkylmetal compounds.

An essential feature of the novel process is the use of processing temperatures of 160° to 260° C. These temperatures ensure that the thermoplastic material is sufficiently plasticized so that a permanent bond between the polymer particles is built up under the pressure used. Preferred temperatures are of 190° to 220° C. In the material barrel, i.e. the space upstream of the nozzle, in which the polymer powder has been plasticized, the heated material is under a pressure of 80 to 150 MPA, in particular 100 to 120 MPa. By means of this pressure (injection pressure), it is forced through the nozzle into the mold cavity. The pressure is set so that the particles adhere to one another, forming channels, but compact solids are not produced.

The injection pressure described above is dependent on the viscosity of the thermoplastic polymer and additionally on the mold geometry and thus the molding shape. Long flow distances and narrow flow path cross sections in the mold cavity require higher injection pressures than do short flow distances and broad flow path cross sections. According to the Invention, the ratio between the flow distance of the material in the mold and the wall thickness of the molding should not exceed 7.5. In the case of moldings or irregular shape, wall thickness is in each case taken to mean the thickness of the thinnest wall.

In a preferred embodiment of the novel process, the internal pressure in the mold is at most 0.05 MPa. The level of this pressure represents compaction of the plasticized material, and thus the degree of filling of the mold, and establishes the density and weight of the porous molding. The internal pressure in the mold is measured in a known manner.

The novel process is carried out in injection-molding machines of conventional design. An example of such apparatus is shown in diagrammatic form in the attached figure. The pulverulent polymer is conveyed from hopper 1 into barrel 3 by screw 2. Barrel 3 is heated to the requisite processing temperature by heating device 4. The plasticized material passes through nozzle 5 into the mold, which comprises fixed mold half 6 and movable mold half 7, which together form mold cavity 8.

The Invention is described in greater detail by means of the examples below, which illustrate the Invention but do not limit it.

EXAMPLE 1 (COMPARISON)

PE-UHMW having an intrinsic viscosity of 2000 ml/g, a mean particle size of 70 μm, and a bulk density of 0.45 g/cm³ (Hostalen GUR, producer: Hoechst AG) is injected into the mold at a material temperature of 220° C. and an injection pressure of 85 MPa. The gates are set up so that the flow distance/wall thickness ratio is 7.5.

The molding obtained does not have uniform pore size.

EXAMPLE 2

Example 1 is repeated with a PE-UHMW grade having the same intrinsic viscosity and bulk density, but having a mean particle size of 210 μm. The moldings obtained have a uniform pore width, and the mean pore diameter is 12 μm.

EXAMPLE 3 (COMPARISON)

Example 1 is repeated with a PE-UHMW grade having the same intrinsic viscosity a bulk density of 0.25 g/cm³ and a mean particle size of 120 μm. The injection moldings obtained do not have a uniform pore width.

EXAMPLE 4 (COMPARISON)

The polymer from Example 2 is injected into a mold under such conditions that the flow distance/wall thickness ratio is 20. In this case, the pore width increases over the flow path. The mold cannot be fully filled.

EXAMPLE 5 (COMPARISON)

Example 4 is repeated, but the flow distance/wall thickness ratio is reduced to 10. Filling of the mold is significantly improved, but the pore width profile is less pronounced. The mean pore diameter is 12 μm.

EXAMPLE 6

A PE-UHMW grade having an intrinsic viscosity of 2650 ml/g, a mean particle size of 350 μm, and a bulk density of 0.43 g/cm³, is processed under the conditions of Example 1. The ratio of the flow distance in the injection mold to the wall thickness of the molding is 7.0. The products have uniform pore widths and a mean pore diameter of 20 μm.

While only a limited number of specific embodiments of the present Invention have been expressly disclosed, it is, nonetheless, to be broadly construed, and not to be limited except by the character of the claims appended hereto.

What we claim is:

1. A process for the production of a porous molding having a wall thickness, said process comprising injection into a mold having a flow distance, of pulverulent, ultrahigh-molecular-weight polyethylene having an intrinsic viscosity of 500 to 5000 ml/g, a mean particle size of 100 to 1500 μm, and a bulk density of at least 0.35 g/cc, said injection taking place at an injection temperature of 160° to 260° C. and an injection pressure of 80 to 150 MPa, a ratio of said flow distance to said wall thickness not exceeding 7.5.

2. The process of claim 1 wherein said intrinsic viscosity is 1300 to 3000 ml/g.

3. The process of claim 1 wherein said particle size is 200 to 1000 μm.

4. The process of claim 1 wherein said bulk density is 0.4 to 0.6 g/cc.

5. The process of claim 1 wherein said injection temperature is 190° to 220° C.

6. The process of claim 1 wherein said injection pressure is 100 to 120 MPa.

7. The process of claim 1 wherein internal pressure in said mold does not exceed 0.05 MPa.

* * * * *